(12) United States Patent
Kass

(10) Patent No.: US 7,315,125 B2
(45) Date of Patent: Jan. 1, 2008

(54) ALUMINUM-FREE BOROSILICATE GLASS AND APPLICATIONS THEREOF

(75) Inventor: Christof Kass, Tirschenreuth (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/515,064

(22) Filed: Sep. 1, 2006

(65) Prior Publication Data

US 2007/0004580 A1    Jan. 4, 2007

Related U.S. Application Data

(62) Division of application No. 10/643,237, filed on Aug. 18, 2003, now Pat. No. 7,144,835.

(30) Foreign Application Priority Data

Aug. 24, 2002 (DE) ................. 102 38 930

(51) Int. Cl.
   *H01J 17/16* (2006.01)
   *C03C 3/089* (2006.01)

(52) U.S. Cl. ........................ 313/636; 501/65

(58) Field of Classification Search ................ 501/65; 313/636

See application file for complete search history.

(56) References Cited

U.S. PATENT DOCUMENTS

| | | | |
|---|---|---|---|
| 3,499,776 A * | 3/1970 | Baak et al. ................... 501/67 |
| 3,574,666 A * | 4/1971 | Smalley et al. .............. 428/216 |
| 3,998,647 A * | 12/1976 | Yamashita et al. ............ 501/13 |
| 4,562,161 A * | 12/1985 | Mennemann et al. ......... 501/59 |
| 5,523,265 A * | 6/1996 | Rapp et al. ................... 501/35 |
| 6,544,654 B1 * | 4/2003 | Fukaya et al. .............. 428/432 |
| 7,144,835 B2 * | 12/2006 | Kass et al. .................... 501/65 |
| 7,196,027 B2 * | 3/2007 | Masumura et al. ........... 501/57 |

* cited by examiner

*Primary Examiner*—J. A. Lorengo
*Assistant Examiner*—Elizabeth A. Bolden
(74) *Attorney, Agent, or Firm*—Michael J. Striker

(57) ABSTRACT

The fluorescent lamp is made with an aluminum-free borosilicate glass having a composition, in percent by weight, based on oxide content of: $SiO_2$, 65-77; $B_2O_3$, 7-20; $Li_2O$, 0-2; $Na_2O$, 0-4; $K_2O$, 3-12; MgO, 0-2; CaO, 0-2; with MgO+CaO, 0-3; BaO, 0-3; ZnO, 0-2; $ZrO_2$, 0.8-12; $TiO_2$, 0-10; $CeO_2$, 0-1; and $F^-$, 0-0.6. Preferred embodiments with more than 1% by weight $TiO_2$ have especially good UV blocking properties and are especially suitable for lamp glass for backlights. Other embodiments have good sealing properties to tungsten, KOVAR®, and molybdenum and have coefficients of thermal expansion α of 4.7 to $5.3 \times 10^{-6}$/K, good chemical resistance, and a working point $V_A$ of between 990° C. and 1290° C.

7 Claims, No Drawings

ALUMINUM-FREE BOROSILICATE GLASS AND APPLICATIONS THEREOF

CROSS-REFERENCE

This is a divisional of U.S. patent application Ser. No. 10/643,237, filed Aug. 18, 2003, now U.S. Pat. No. 7,144,835, which provides the basis for a claim of priority under 35 U.S.C. 120.

BACKGROUND OF THE INVENTION

1. Field of the Invention

The invention relates to borosilicate glass and also to uses of the glass.

2. Description of the Related Art

The group of the borosilicate glasses is extremely extensive. The representatives of this group have the following basic composition range in common:
$SiO_2$, approx. 70 to 80 percent by weight,
$B_2O_3$, 7 to 20 percent by weight,
$Al_2O_3$, 2 to 7 percent by weight,
Alkali metal oxides, 3 to 10 percent by weight.

The glasses contain aluminum oxide in order to improve their resistance to devitrification and the chemical resistance.

However, glasses of this type release aluminum ions to a wetting aqueous liquid, which is disadvantageous for certain applications. For example, aluminum is currently suspected of harming the health of people of corresponding disposition. In such cases, therefore, conventional primary pharmaceutical packaging materials made from glass are relatively unsuitable for the administration of injectable substances.

Furthermore, aluminum oxide increases the melting and working points of the glasses considerably, increasing the energy consumption involved in the production processes.

The physical and glass-technical properties influenced by $Al_2O_3$ generally cannot be reproduced by simply replacing the aluminum oxide with one or more other constituents. Rather, completely new developments or extensive changes to the glass composition are required.

Standard borosilicate glasses are distinguished by their high chemical stability and their high ability to withstand temperature changes. They have a low coefficient of thermal expansion.

On account of these properties, they are used in particular as ampoules and vials in the pharmaceutical industry for packaging, for example, injection preparations, for apparatus and equipment used in the chemical industry, both in production and on a laboratory scale, or as lamp glasses.

There is extensive patent literature concerning glasses of this type.

For example, DE 42 30 607 C1 describes chemically highly resistant borosilicate glasses which can be fused to tungsten. According to the examples, the glasses have working points $V_A$>1210° C.

The borosilicate glasses described in German Laid-Open Specification DE 37 22 130 A1 also have high working points. Although the glasses belong to the first hydrolytic glass, they are relatively susceptible to crystallization, on account of the absence of $K_2O$ in these glasses.

The $Li_2O$-containing glasses described in German Patent DE 195 36 708 C1 are also highly chemically stable but also have disadvantageously high working points.

The glasses described in German Patent DE 44 30 710 C1 have a high $SiO_2$, content, namely >75 percent by weight and >83 percent by weight of $SiO_2+B_2O_3$ in combination with an $SiO_2/B_2O_3$ weight ratio of >8, which means that they are chemically highly stable but also have excessively high working points.

SUMMARY OF THE INVENTION

Therefore, it is an object of the invention to find a glass, which satisfies the above-mentioned requirements imposed on previous borosilicate glasses, has favorable working points and is free of $Al_2O_3$.

According to the invention the aluminum-free borosilicate glass has good chemical resistance and a composition, in percent by weight, based on oxide content, of:

| | |
|---|---|
| $SiO_2$ | 60-78 |
| $B_2O_3$ | 7-20 |
| $Li_2O$ | 0-2 |
| $Na_2O$ | 0-4 |
| $K_2O$ | 3-12 |
| MgO | 0-2 |
| CaO | 0-2 |
| with MgO + CaO | 0-3 |
| BaO | 0-3 |
| ZnO | 0-2 |
| $ZrO_2$ | 0.8-12 |
| $TiO_2$ | 0-10 |
| $CeO_2$ | 0-1 |
| $F^-$ | 0-0.6 | and optionally at least one refining agent in a standard amount for refining.

The glass according to the invention has an $SiO_2$ content of at least 60, preferably at least 63% by weight, and at most 78% by weight, preferably of 65 to 77% by weight, especially of 67 to 75% by weight, particularly preferably of 68 to 74% by weight. The $SiO_2$ content varies according to the specific application of the glass and has an advantageous effect on the desired properties of high chemical resistance, in particular high acid resistance, and low coefficient of thermal expansion.

The glass contains 7-20% by weight, preferably 9 to 18% by weight, particularly preferably 9-13% by weight, of $B_2O_3$ in order to reduce the thermal expansion, the working point and the melting point while at the same time improving the chemical resistance, in particular the hydrolytic stability. The boric acid bonds the alkali metal ions which are present in the glass more firmly into the glass structure, which leads to a reduced release of alkali metal ions in contact with solutions, for example during the measurement of the hydrolytic stability. Whereas at low contents the hydrolytic stability would deteriorate significantly and the melting point would not be reduced far enough, at higher contents the acid resistance would deteriorate. Although levels of over 13% of $B_2O_3$ adversely affect the chemical resistance, for certain applications, such as lamp glass for electronic flashbulbs and backlights, they have the advantage that the high boric acid content additionally produces a higher electrical resistance of the glass.

Apart from inevitable impurities, the glass is free of $Al_2O_3$.

The individual alkali metal oxide contents within certain limits are important for the glass according to the invention, so that in particular the hydrolytic stability is improved compared to the specific prior art glass, which is intended for the corresponding use.

For example, the glass contains 0-4% by weight of $Na_2O$, preferably 0-3% by weight of $Na_2O$, 3-12% by weight of $K_2O$, preferably 5-10% by weight of $K_2O$, and 0-2% by weight of $Li_2O$, preferably 0-1% by weight of $Li_2O$. The sum of the alkali metal oxides is preferably between 5.5 and 13.5% by weight.

It is particularly preferable for $Na_2O$ or $Li_2O$ to be present in the glass in addition to $K_2O$. It is very particularly preferable for $Na_2O$ and $Li_2O$ to be present in the glass in addition to $K_2O$.

The alkali metal oxides reduce the working point of the glass, and moreover high $K_2O$ contents improve the resistance to devitrification, a property that is of crucial importance in the $Al_2O_3$-free glass according to the invention. During the cooling, as part of the forming process, for example tube join, no devitrification crystals, which would remain at the glass surface and adversely affect the forming and use of the glass, are formed.

The release of alkali metal ions increases disproportionately above the respective upper limit of the alkali metal oxide. Conversely, the specific levels result in a minimum release of alkali metal ions, leading to the various excellent chemical resistances.

In a very particularly preferred embodiment, the glass contains at least 0.2% by weight of $Li_2O$. In a very particularly preferred embodiment, the glass contains at least 0.3% by weight of $Na_2O$, in particular at least 0.5% by weight of $Na_2O$.

As further components, the glass may contain the divalent oxides MgO in an amount of 0-2% by weight, CaO in an amount of 0-2% by weight, preferably 0-1% by weight, ZnO in an amount of 0-2% by weight and BaO in an amount of 0-3% by weight, preferably 0-1% by weight. These components vary the "length of the glass", i.e. the temperature range within which the glass can be processed. The differing extent to which these components modify the network means that, by swapping between these oxides, it is possible to match the viscosity characteristics to the requirements of the particular production and working process. CaO and MgO reduce the working point and are securely bonded into the glass structure. The sum of CaO and MgO should be between 0 and 3% by weight, since at higher levels the thermal expansion increases. The addition of BaO makes it possible to reduce the working point without adversely affecting the hydrolytic stability of the glass.

It is preferable for the glass to be free of MgO, CaO, BaO and to contain between 0-1% by weight of ZnO. In particularly preferred embodiments, ZnO is also not present.

The glass contains 0.8-12% by weight of $ZrO_2$, preferably at most 10.5% by weight of $ZrO_2$, especially at least 1.5% by weight of $ZrO_2$, in particular at least 2% by weight of $ZrO_2$, particularly preferably 3-7% by weight of $ZrO_2$. $ZrO_2$ improves the hydrolytic stability and in particular the alkali resistance of the glass. At higher levels, the working point would be increased excessively without the chemical resistances being improved significantly any further.

The glass may contain up to 10% by weight, preferably up to 6% by weight, especially up to 5% by weight of $TiO_2$. Small amounts of up to 1% by weight of $TiO_2$ prevent solarization of the glass, the subsequent darkening of, for example, a lamp produced therefrom while it is operating, and also even improve the chemical resistance. Levels of over 1% by weight in particular improve the chemical resistance of the glass, e.g. the alkali resistance. A $TiO_2$ content of between 0 and 1% by weight is particularly preferred. In a particularly preferred embodiment, the glass is free of $TiO_2$. In another embodiment, the glass contains at least 0.5% by weight of $TiO_2$. $TiO_2$ in this case has UV-blocking action. A $TiO_2$ content of at least 4.5% by weight of $TiO_2$ is preferred.

The glass may contain up to 1% by weight of $CeO_2$. In low concentrations, $CeO_2$ acts as a refining agent, while in higher concentrations it prevents the glass from being discolored by radioactive radiation. Therefore, seals made using a $CeO_2$-containing glass of this type can still be visually checked for any damage, such as cracks or corrosion to the conductor wire, even after they have been subjected to radioactive exposure. A high transparency of the glass is also desirable when the glass is used as primary pharmaceutical packaging material, since the contents are checked for any particles, which may be present. Still higher $CeO_2$ concentrations make the glass more expensive and lead to an undesirable yellow-brownish coloration of the glass. For uses in which the ability to avoid discoloration caused by radioactive radiation is not crucial, a $CeO_2$ content of between 0 and 0.4% by weight is preferred. The glass may without problems contain up to 0.5% by weight of $Fe_2O_3$. It preferably contains 0-0.1% by weight of $Fe_2O_3$.

Furthermore, the glass may contain up to 0.6% by weight of $F^-$. This reduces the viscosity of the melt, which accelerates the melting of the batch and the refining of the melt. Moreover, as the F content of the glass increases, the pH of an aqueous solution, which is in contact with the glass, is buffered. What this means is that the increase in the pH in the filling contents which results from the release of alkali metal ions from the inner surface of the glass after injectable substances have been introduced into glass vessels is partially neutralized by $F^-$ ions.

The glass may, if appropriate, contain further refining agents in addition to the above-mentioned $CeO_2$ and fluorides, for example $Na_2SiF_6$. For example, it can be refined using standard refining agents, such as chlorides, for example NaCl, and/or sulfates, for example $Na_2SO_4$, which are to be found in standard quantities, i.e., depending on the quantity and type of refining agent used, in quantities of from 0.003 to 1% by weight, in the finished glass. If $As_2O_3$ and $Sb_2O_3$ are not used, the glasses are free of $As_2O_3$ and $Sb_2O_3$, apart from inevitable impurities, which is particularly advantageous for their use as primary pharmaceutical packaging material.

The glass according to the invention has a coefficient of thermal expansion $\alpha_{20/300}$ of between $3.0 \times 10^{-6}$/K and $6 \times 10^{-6}$/K, so that it can be successfully fused to materials with similar thermal expansion characteristics, for example to molybdenum, tungsten and Fe—Co—Ni alloys, for example KOVAR®.

The glass has a high ability to withstand temperature changes and a high ability to withstand thermal loads. The glass has very high chemical resistances, in particular a high hydrolytic stability and a high alkali resistance. The glass has a very high resistance to devitrification, meaning that it is also eminently suitable for hot-forming by means of tube join. It is eminently suitable for use as apparatus glass.

The glass has working points of between 990° C. and 1290° C. The glass has relatively low melting points, namely between approximately 1480° C. and approximately 1590° C.

The resulting favorable melting and working range reduces the energy consumption during production.

Apart from inevitable impurities, the glass is free of $Al_2O_3$.

With this range of properties, the glass is eminently suitable for a very wide range of uses, for example for use as primary pharmaceutical packaging material, such as ampoules or vials, since the substances stored in the containers, in particular aqueous solutions, do not significantly attack the glass, i.e. the glass does not release any ions or releases only a few ions, in particular does not release any aluminum ions.

The glass is eminently suitable as a sealing glass for glass-metal seals, for example for sealing to molybdenum, tungsten and KOVAR®.

The glass is eminently suitable as a lamp glass, particularly as a glass for electronic flashbulbs and for fluorescent lamps, in particular for miniaturized fluorescent lamps, known as backlights.

The glass is eminently suitable for processing to form glass fibers, in particular to form glass fibers for reinforcing concrete.

Various sub-ranges are particularly preferred within the composition range claimed. These sub-ranges are particularly suitable for specific application areas.

For example, an $Al_2O_3$-free borosilicate glass having the composition (in % by weight, based on oxide) $SiO_2$ 71-74, $B_2O_3$ 9-12, $Li_2O$ 0-1, $Na_2O$ 0-3, $K_2O$ 7-10, with $Li_2O+Na_2O+K_2O$ 7-13.5, $ZrO_2$ 4 to 7 and, if appropriate, standard refining agents in standard quantities for refining, is particularly preferred.

A glass of this type satisfies the requirements of resistance classes 1 both in terms of hydrolytic stability and in terms of acid and alkali resistance. It is particularly suitable for use as a primary pharmaceutical packaging material.

Furthermore, a glass having the composition (in % by weight, based on oxide) $SiO_2$ 68-71, $B_2O_3$ 8-11, $Li_2O$ 0-1, $Na_2O$ 0-3, $K_2O$ 8-11, with $Li_2O+Na_2O+K_2O$ 8-13.5, $ZrO_2$ 7.5-10.5 and, if appropriate, standard refining agents in standard quantities for refining, is particularly preferred.

This glass with a high $ZrO_2$ content likewise fulfils the requirements of classes 1 of the above-mentioned chemical resistances. Particularly on account of its excellent alkali resistance, it is especially suitable as a glass for glass fibers in concrete.

Furthermore, a glass belonging to the composition range (in % by weight, based on oxide) $SiO_2$ 70-75, $B_2O_3$ 15-18, $Li_2O$ 0-1, $Na_2O$, 0-3, $K_2O$ 5-8, with $Li_2O+Na_2O+K_2O$ 5.5-10.5, CaO 0-1, BaO 0-1, $TiO_2$ 0-1, $ZrO_2$ 0.8-5 and, if appropriate, standard refining agents in standard quantities for refining, is particularly preferred.

On account of its coefficient of thermal expansion $\alpha(20°$ C.; 300° C.) of between $4.7 \times 10^{-6}$/K and $5.3 \times 10^{-6}$/K, it is particularly suitable as a sealing glass for sealing to tungsten.

A glass belonging to the composition range (in % by weight, based on oxide) $SiO_2$ 67-70, $B_2O_3$ 15-18, $Li_2O$ 0-1, $Na_2O$ 0-3, $K_2O$ 7-10, with $Li_2O+Na_2O+K_2O$ 7-12.5, ZnO 0-1, $ZrO_2$ 2.5-6 and, if appropriate, standard refining agents in standard quantities for refining, is also particularly preferred.

On account of its coefficient of thermal expansion $\alpha(20°$ C.; 300° C.) of between $4.7 \times 10^{-6}$/K and $5.3 \times 10^{-6}$/K, it is particularly suitable as a sealing glass for sealing to molybdenum and to KOVAR®.

The latter two groups are especially suitable for use as lamp glasses.

In particular on account of the high electrical resistance of the glasses, caused by the high $B_2O_3$ contents, they are particularly suitable for use as bulbs for electronic flashbulbs and for fluorescent lamps, in particular miniaturized fluorescent lamps.

Furthermore, a glass belonging to the composition range (in % by weight, based on oxide) $SiO_2$ 74-78, $B_2O_3$ 12-15, $Li_2O$ 0-1, $Na_2O$ 0-3, $K_2O$ 3-8, with $Li_2O+Na_2O+K_2O$ 3-11, ZnO 0-1, $ZrO_2$ 2.5-7 and, if appropriate, standard refining agents in standard quantities is particularly preferred. On account of its high chemical resistances and its low coefficient of thermal expansion, it is particularly suitable as glass for equipment and apparatus, in particular for laboratory and production areas in particular in the chemical industry.

EXAMPLES

Eleven examples of glasses according to the invention (A1-A11) and four $Al_2O_3$-containing comparative examples (V1-V4) were melted from standard raw materials.

Table I gives the respective compositions (in % by weight, based on oxide content) of the glasses and important properties of the glasses, namely the coefficient of thermal expansion $\alpha(20°$ C.; 300° C.) $[10^{-6}$/K], the transformation temperature $T_g[°$ C.], the softening point $E_w[°$ C.], the working point $V_A[°$ C.] and the hydrolytic stability, the acid resistance and the alkali resistance.

To document the blocking in the UV region, for examples A6-A11 the maximum wavelength at which the transmission $\tau<0.1\%$ (for a specimen thickness of 0.2 mm) is given ("UV blocking").

The chemical resistances were determined in the following way:

- the hydrolytic stability H in accordance with DIN ISO 719. The table in each case indicates the base equivalent of the acid consumption as μg $Na_2O$/g of glass grit. The maximum value for a chemically highly resistant glass belonging to hydrolytic class 1 is 31 μg $Na_2O$/g. The maximum value for a glass belonging to hydrolytic class 2 is 62 μg $Na_2O$/g. The maximum value for hydrolytic class 3 is 264 μg $Na_2O$/g.
- The acid resistance S in accordance with DIN 12116. The table in each case indicates the weight loss in mg/dm². The maximum loss for an acid-resistant glass belonging to acid class 1 is 0.70 mg/dm². The maximum loss for a glass belonging to acid class 2 is 1.5 mg/dm². The maximum loss for acid class 3 is 15 mg/dm².
- The alkali resistance L in accordance with DIN ISO 695. The table in each case indicates the weight loss in mg/dm². The maximum loss for a glass belonging to alkali class 1 (weakly soluble in alkaline solutions) is 75 mg/dm². The maximum loss for a glass belonging to alkali class 2 is 175 mg/dm².

TABLE I

COMPOSITIONS (in % by weight, based on oxide) OF
EXEMPLARY EMBODIMENTS (A1-A2) AND COMPARATIVE EXAMPLES (V1-V4)
AND THEIR MAIN PROPERTIES

|  | A1 | A2 | A3 | A4 | A5 | A6 | A7 | A8 |
|---|---|---|---|---|---|---|---|---|
| $SiO_2$ | 73.0 | 69.5 | 73.5 | 68.6 | 76.5 | 63.6 | 63.1 | 65.0 |
| $B_2O_3$ | 10.8 | 9.5 | 17.0 | 17.5 | 13.7 | 17.5 | 17.5 | 16.5 |
| $Al_2O_3$ | — | — | — | — | — | — | — | — |

TABLE I-continued

COMPOSITIONS (in % by weight, based on oxide) OF
EXEMPLARY EMBODIMENTS (A1-A2) AND COMPARATIVE EXAMPLES (V1-V4)
AND THEIR MAIN PROPERTIES

| | A1 | A2 | A3 | A4 | A5 | A6 | A7 | A8 |
|---|---|---|---|---|---|---|---|---|
| $Li_2O$ | 0.3 | 0.4 | 0.15 | 0.7 | 0.2 | 0.7 | 0.7 | 0.7 |
| $Na_2O$ | 1.7 | 2.0 | 0.1 | 0.90 | 0.3 | 0.9 | 0.9 | 1.6 |
| $K_2O$ | 8.8 | 9.5 | 6.2 | 8.7 | 4.8 | 8.7 | 8.7 | 7.7 |
| MgO | — | — | — | — | — | — | — | — |
| CaO | — | — | 0.90 | — | — | — | — | — |
| BaO | — | — | 0.65 | — | — | — | — | — |
| ZnO | — | — | — | 0.8 | — | 0.8 | 0.8 | 1.5 |
| $TiO_2$ | — | — | 0.5 | — | — | 4.9 | 5.4 | 4.9 |
| $ZrO_2$ | 5.4 | 9.0 | 1.0 | 2.8 | 4.5 | 2.8 | 2.8 | 2.0 |
| $\alpha[10^{-6}/K]$* | 5.10 | 5.25 | 3.95 | 5.10 | 3.30 | 5.09 | 5.17 | 5.12 |
| $T_g[°C.]$ | 560 | 560 | 535 | 505 | 525 | 503 | 506 | 501 |
| $E_w[°C.]$ | n.d. | n.d. | 785 | 725 | n.d. | n.d. | n.d. | n.d. |
| $V_A[°C.]$ | 1170 | 1180 | 1155 | 1060 | 1270 | 1012 | 1002 | 1012 |
| H[μg/g of $Na_2O$] | 9 | 8 | 140 | 110 | 8 | n.d. | n.d. | n.d. |
| S[mg/dm$^2$] | 0.5 | 0.5 | 2.8 | 3.3 | n.d. | n.d. | n.d. | n.d. |
| L[mg/dm$^2$] | 44 | 28 | 130 | 105 | n.d. | n.d. | n.d. | n.d. |
| UV blocking [nm] | n.d. | n.d. | n.d. | n.d. | n.d. | 303 | 305 | 303 |

| | A9 | A10 | A11 | V1 | V2 | V3 | V4 |
|---|---|---|---|---|---|---|---|
| $SiO_2$ | 65.5 | 65.5 | 65.0 | 72.7 | 75.5 | 69 | 81.0 |
| $B_2O_3$ | 16.5 | 16.5 | 16.5 | 10.0 | 16.5 | 18.5 | 12.0 |
| $Al_2O_3$ | — | — | — | 6.1 | 1.5 | 3 | 2.5 |
| $Li_2O$ | 0.7 | 0.7 | 0.7 | — | — | 0.5 | — |
| $Na_2O$ | 1.0 | 1.6 | 1.0 | 7.2 | 4 | 1 | 3.5 |
| $K_2O$ | 7.7 | 7.6 | 7.7 | 1.3 | 1.5 | 7.5 | 0.6 |
| MgO | — | — | — | — | 0.5 | — | — |
| CaO | — | — | — | 1.1 | 0.5 | — | — |
| BaO | — | — | — | 1.6 | — | — | — |
| ZnO | 2.0 | 2.0 | 2.0 | — | — | 0.5 | — |
| $TiO_2$ | 4.9 | 5.0 | 6.5 | — | — | — | — |
| $ZrO_2$ | 1.5 | 1.0 | 1.5 | — | — | — | — |
| $\alpha[10^{-6}/K]$* | 4.95 | 5.16 | 5.13 | 5.50 | 3.90 | 4.95 | 3.30 |
| $T_g[°C.]$ | 497 | 500 | 497 | 565 | 525 | 495 | 525 |
| $E_w[°C.]$ | n.d. | n.d. | n.d. | 765 | 775 | 720 | 825 |
| $V_A[°C.]$ | 1018 | 999 | 1010 | 1150 | 1135 | 1055 | 1260 |
| H[μg/g of $Na_2O$] | n.d. | n.d. | n.d. | 13 | 190 | 160 | 8 |
| S[mg/dm$^2$] | n.d. | n.d. | n.d. | 0.6 | 3.4 | 20 | 0.5 |
| L[mg/dm$^2$] | n.d. | n.d. | n.d. | 126 | 215 | 261 | 140 |
| UV blocking [nm] | 306 | 302 | 320 | n.d. | n.d. | n.d. | n.d. |

*(20° C.; 300° C.);
n.d. = not determined

Glass A1 is particularly suitable as pharmaceutical glass, has a better hydrolytic stability than most comparative glasses and for all the chemical resistances fulfills the requirements of the corresponding class 1. The melting point is 1530° C. and is approximately 50° C. lower than that of the comparative glasses.

Glass A2 is particularly suitable as glass for glass fibers in concrete. It likewise fulfills the requirements of classes 1 for all the chemical resistances and in particular has an excellent alkali resistance. The melting point is 1530° C., corresponding to that of a conventional pharmaceutical glass.

Glass A3 is particularly suitable as tungsten sealing glass and has better chemical resistances and an improved resistance to devitrification than the comparative glass V2. The melting point of A3 is 1560° C.

Glass A4 is particularly suitable as a sealing glass for molybdenum and metals of the KOVAR® class and has better chemical resistances than the comparative glass V3.

Glass A5 is particularly suitable as glass for equipment and apparatus in laboratories and production areas used in the chemical industry. It has a high ability to withstand temperature changes and the same low coefficient of thermal expansion as the comparative glass V4.

Glasses A6-A11, which have a high $TiO_2$ content, have very good UV blocking properties. They are therefore particularly suitable as lamp glasses for fluorescent lamps, in particular for miniaturized fluorescent lamps.

The disclosure in German Patent Application 102 38 930.6-45 of Aug. 24, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in aluminum-free borosilicate glass and articles made therewith, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A fluorescent lamp comprising a lamp glass, said lamp glass consisting of an aluminum-free borosilicate glass, said aluminum-free borosilicate glass having chemical resistance and a composition, in percent by weight, based on oxide content, of:

| | |
|---|---|
| $SiO_2$ | 60-78 |
| $B_2O_3$ | 7-20 |
| $Li_2O$ | 0-2 |
| $Na_2O$ | 0-4 |
| $K_2O$ | 3-12 |
| MgO | 0-2 |
| CaO | 0-2 |
| with MgO + CaO | 0-3 |
| BaO | 0-3 |
| ZnO | 0-2 |
| $ZrO_2$ | 0.8-12 |
| $TiO_2$ | 0-10 |
| $CeO_2$ | 0-1 |
| $F^-$ | 0-0.6 | and optionally at least one refining agent in a standard amount for refining.

2. The fluorescent lamp as defined in claim 1 and consisting of a miniaturized fluorescent lamp or a backlight.

3. The fluorescent lamp as defined in claim 1, wherein said aluminum-free borosilicate glass contains greater than 1% by weight of said $TiO_2$.

4. The fluorescent lamp as defined in claim 1, wherein said aluminum-free borosilicate glass has a coefficient of thermal expansion $\alpha(20°$ C.; $300°$ C.) of $4.7 \times 10^{-6}$/K and $5.3 \times 10^{-6}$/K, and said composition, in percent by weight, based on oxide content, comprises said $SiO_2$, 70-75; said $B_2O_3$, 15-18; said $Li_2O$, 0-1; said $Na_2O$, 0-3; said $K_2O$, 5-8; said CaO, 0-1; said BaO, 0-1; said $TiO_2$, 0-1; said $ZrO_2$, 0.8-5; and wherein $Li_2O+Na_2O+K_2O$ is 5.5-10.5.

5. The fluorescent lamp as defined in claim 4, wherein said lamp glass is sealed to tungsten.

6. The fluorescent lamp as defined in claim 1, wherein said aluminum-free borosilicate glass has a coefficient of thermal expansion $\alpha(20°$ C.; $300°$ C.) of $4.7 \times 10^{-6}$/K and $5.3 \times 10^{-6}$/K, and said composition, in percent by weight, based on oxide content, comprises said $SiO_2$, 67-70; said $B_2O_3$, 15-18; said $Li_2O$, 0-1; said $Na_2O$, 0-3; said $K_2O$, 7-10; said ZnO, 0-1; said $ZrO_2$, 0.8-5; and wherein $Li_2O+Na_2O+K_2O$, 7-12.5.

7. The fluorescent lamp as defined in claim 6, wherein said lamp glass is sealed to an Fe—Co—Ni alloy or molybdenum.

* * * * *

UNITED STATES PATENT AND TRADEMARK OFFICE
CERTIFICATE OF CORRECTION

PATENT NO. : 7,315,125 B2  Page 1 of 1
APPLICATION NO. : 11/515064
DATED : January 1, 2008
INVENTOR(S) : C. Kass et al.

It is certified that error appears in the above-identified patent and that said Letters Patent is hereby corrected as shown below:

Title Page, Sec. 75 add --Joerg Fechner (DE)--

Signed and Sealed this

Twenty-seventh Day of May, 2008

JON W. DUDAS
*Director of the United States Patent and Trademark Office*